(12) United States Patent
Bieselin et al.

(10) Patent No.: US 8,594,291 B2
(45) Date of Patent: Nov. 26, 2013

(54) TECHNIQUES FOR PLANNING A CONFERENCE USING LOCATION DATA

(75) Inventors: David Bieselin, Menlo Park, CA (US); Randall Ethier, Burke, VA (US)

(73) Assignee: Cisco Technology, Inc., San Jose, CA (US)

( * ) Notice: Subject to any disclaimer, the term of this patent is extended or adjusted under 35 U.S.C. 154(b) by 299 days.

(21) Appl. No.: 12/972,158

(22) Filed: Dec. 17, 2010

(65) Prior Publication Data

US 2011/0087736 A1 Apr. 14, 2011

Related U.S. Application Data

(60) Division of application No. 10/984,402, filed on Nov. 9, 2004, now Pat. No. 7,881,233, which is a continuation-in-part of application No. 10/931,737, filed on Sep. 1, 2004, now Pat. No. 7,876,714.

(51) Int. Cl.
*H04M 3/42* (2006.01)

(52) U.S. Cl.
USPC ..... 379/202.01; 708/112; 370/260; 705/7.13; 705/7.18

(58) Field of Classification Search
USPC ......... 370/260; 708/112; 379/202.01, 265.09; 705/8, 7.13, 7.18
See application file for complete search history.

(56) References Cited

U.S. PATENT DOCUMENTS

| | | | |
|---|---|---|---|
| 4,626,836 A | 12/1986 | Curtis et al. | |
| 4,807,154 A | 2/1989 | Scully et al. | |
| 4,807,155 A | 2/1989 | Cree et al. | |
| 4,817,018 A | 3/1989 | Cree et al. | |
| 4,819,191 A | 4/1989 | Scully et al. | |
| 4,977,520 A | 12/1990 | McGaughey, III et al. | |
| 5,050,077 A | 9/1991 | Vincent | |
| 5,197,000 A | 3/1993 | Vincent | |
| 5,261,045 A | 11/1993 | Scully et al. | |
| 5,774,867 A | 6/1998 | Fitzpatrick et al. | |
| 5,933,810 A | 8/1999 | Okawa | |
| 5,987,463 A | 11/1999 | Draaijer et al. | |
| 6,047,260 A | 4/2000 | Levinson | |
| 6,167,379 A | 12/2000 | Dean | |
| 6,275,575 B1 | 8/2001 | Wu | |
| 6,363,352 B1 | 3/2002 | Dailey et al. | |

(Continued)

OTHER PUBLICATIONS

Gu, P.; Balasubramanian, S.; Norrie, D.H., "Bidding-Based Process Planning and Scheduling in a Multi-Agent System," Computers Ind. Engng, 32(2):477-496 (1997).

(Continued)

*Primary Examiner* — Simon Sing
*Assistant Examiner* — Simon King
(74) *Attorney, Agent, or Firm* — Brinks Gilson & Lione

(57) ABSTRACT

Techniques for scheduling a conference among multiple persons include receiving quorum data and location data. Quorum data indicates a quorum for a particular conference. Location data indicates locations of a plurality of persons who satisfy the quorum. A proposed location for the particular conference is determined based on the location data and the quorum data. These techniques allow location data to include presence data that describes a current location of a person or a state of communication of that person; and therefore allow presence data to be used in determining where to conduct a conference and when. For example, an organizer of a meeting and meeting invitees are notified when the people constituting a quorum cross paths at the same location, or are situated at sites that support remote conferencing.

21 Claims, 4 Drawing Sheets

(56) References Cited

U.S. PATENT DOCUMENTS

| | | | |
|---|---|---|---|
| 6,396,510 | B1 | 5/2002 | Pendse et al. |
| 6,781,920 | B2 | 8/2004 | Bates |
| 7,027,996 | B2 | 4/2006 | Levinson |
| 7,283,970 | B2 | 10/2007 | Cragun |
| 7,299,193 | B2 | 11/2007 | Cragun |
| 7,343,312 | B2 | 3/2008 | Capek et al. |
| 2002/0065689 | A1 | 5/2002 | Bingham et al. |
| 2002/0069406 | A1 | 6/2002 | Aaltonen et al. |
| 2002/0163572 | A1* | 11/2002 | Center et al. ............ 348/14.08 |
| 2003/0020623 | A1 | 1/2003 | Cao et al. |
| 2003/0149605 | A1 | 8/2003 | Cragun |
| 2003/0174826 | A1 | 9/2003 | Hesse |
| 2003/0191676 | A1 | 10/2003 | Templeton |
| 2003/0204474 | A1 | 10/2003 | Capek |
| 2003/0233265 | A1 | 12/2003 | Lee |
| 2004/0064355 | A1 | 4/2004 | Dorenbosch et al. |
| 2004/0078256 | A1 | 4/2004 | Glitho |
| 2005/0027581 | A1 | 2/2005 | Kjesbu et al. |
| 2005/0071213 | A1 | 3/2005 | Kumhyr et al. |
| 2006/0010023 | A1 | 1/2006 | Tromczynski et al. |
| 2007/0005406 | A1 | 1/2007 | Assadian et al. |
| 2008/0228547 | A1 | 9/2008 | Doss et al. |

OTHER PUBLICATIONS

Garrido, Leonardo; Sycara, Katia "Multi-Agent Meeting Scheduling: Preliminary Experimental Results," *AAAI Proceedings of the Second International Conference on Multiagent Systems*, (1996).

Sen. Sandip; Durfee, Edmund H., "On the Design of an Adaptive Meeting Scheduler" *IEEE in Proc. of the Tenth Conference on AI Applications* (1994).

Chang-Shing Lee, Chen-Yu Pan, An Intelligent Fuzzy Agent for Meeting Scheduling Decision Support System, *Fuzzy Sets and Systems*, 142(3):467-488 (2004).

Non-Final Office Action dated Apr. 12, 2010 cited in U.S. Appl. No. 10/983,283.

Final Office Action dated Apr. 30, 2010 cited in U.S. Appl. No. 10/958,523.

Non-Final Office Action dated Mar. 30, 2010 cited in U.S. Appl. No. 10/931,737.

Notice of Allowance dated Sep. 27, 2010 in U.S. Appl. No. 10/931,737, filed Sep. 1, 2004.

Notice of Allowance dated Sep. 29, 2010 in U.S. Appl. No. 10/983,283, filed Nov. 5, 2004.

Non-Final Office Action dated Oct. 16, 2009 cited in U.S. Appl. No. 10/983,283.

Non-Final Office Action dated Mar. 25, 2009 cited in U.S. Appl. No. 10/983,283.

Non-Final Office Action dated Oct. 7, 2009 cited in U.S. Appl. No. 10/958,523.

Non-Final Office Action dated Oct. 13, 2009 cited in U.S. Appl. No. 10/931,737.

Non-Final Office Action dated Mar. 25, 2009 cited in U.S. Appl. No. 10/931,737.

Beard, David; Palaniappan, Murugappan; Humm, Alan; Banks, David; Nair, Anil; Shan, Yen-Ping. "A visual Calendar for Scheduling Group Meetings". Oct. 1990. CSCW 1990 Proceedings. pp. 279-290.

Hayes, Thomas; Sen, Sandip; Arora, Neerag; Nadella, Rajani. "An Automated Meeting Scheduling System that Utilizes User Preferences." 1997. International Conference on Autonomous Agents. Proceedings of the First International Conference on Autonomous Agents. pp. 308-315.

Office Action, dated Apr. 5, 2013, pp. 1-62, U.S. Appl. No. 10/958,523, U.S. Patent and Trademark Office, Alexandria, VA.

Office Action, dated Sep. 16, 2013, pp. 1-57, U.S. Appl. No. 10/958,523, U.S. Patent and Trademark Office, Alexandria, VA.

\* cited by examiner

TECHNIQUES FOR PLANNING A CONFERENCE USING LOCATION DATA

CROSS-REFERENCE TO RELATED APPLICATIONS

This application claims benefit as a divisional application to U.S. patent application Ser. No. 10/984,402, filed Nov. 9, 2004, which is a continuation-in-part of U.S. patent application Ser. No. 10/931,737, filed Sep. 1, 2004 (hereinafter Ethier). The entire contents of the above applications are hereby incorporated by reference as if fully set forth herein.

BACKGROUND OF THE INVENTION

1. Field of the Invention

The present invention relates to using availability data shared among users to schedule conferences (including meetings) among users, and in particular to schedule a conference based on location data, such as presence data.

2. Description of the Related Art

A number of software applications are available for scheduling conferences among busy members of an organization. For example, a commercial meeting scheduling application is available from Meeting Maker Inc. of Waltham, Massachusetts; and from Latitude of Santa Clara, Calif. (a subsidiary of Cisco Systems Inc. of San Jose, Calif.). These applications have in common a database that stores information related to a calendar of conferences and appointments each member is scheduled to attend. Such a database is herein called a shared electronic calendar. For purposes of the following discussion, the term conference includes any simultaneous coming together of multiple parties for communication, whether involving a meeting held in person or involving remote communications, including data, audio, video, or multi-media communications, or some combination of in-person meetings and remote communications.

For example, some systems allow a conference organizer user (the "organizer") to specify a list of mandatory attendees and a list of optional attendees from the organization. The scheduling application ("scheduler") then determines one or more proposed times that all the mandatory attendees can attend a meeting based on data in the organization's shared electronic calendar. The proposed times are presented one at a time in chronological order. The scheduler also lists the optional attendees who are also available to attend each proposed time. The organizer then sends a message to the selected attendees for one of the proposed times, inviting them to attend the meeting.

While greatly simplifying the task of finding times when a limited number of persons are available for a conference, the existing systems still suffer some deficiencies.

For example, under some circumstances, such as when the list of mandatory attendees is large, the first proposed time may be too distant to be useful for the purposes of the conference. For example, the purpose of the meeting may be to determine what research results to present at an upcoming scientific convention. When the first proposed time is too close to, or after, the start of the convention, the first proposed time is not useful for accomplishing the purpose of the meeting. The existing systems do not give an organizer sufficient automatic choices to resolve such a scheduling conflict.

One approach would be for an organizer to identify one or more representative groups of persons without requiring a particular member of the group to attend.

For example, suppose that a conference is desired to determine what research to present at a scientific convention on the topic of possible priori-based diseases above and beyond bovine spongiform encephalopathy (also known as "Mad Cow" disease). In this example, the determination requires the attendance of a scientists in six disciplines including discipline A (protein biochemistry), discipline B (poultry and wild game bird biology), discipline C (domesticated and wild game swine biology), discipline D (domesticated and wild bovine biology), discipline E (ichthyology), and discipline F (medical pathology). Furthermore, in this example, the organization includes two scientists in each discipline, but due to their busy schedules, as reflected in their electronic calendars, all twelve of these scientists cannot convene for a joint conference until after the scientific convention. Only one person of each pair of scientists in each discipline need attend the pre-convention conference. Thus a minimum of six scientists are needed for a quorum, provided they represent the six disciplines. There are $2^6$ (i.e., 64) combinations of minimum conference attendees which are acceptable in this example.

With extant scheduling systems, an organizer has to enter all 64 combinations manually and obtain one or more proposed dates for each combination. Then the organizer would have to review the 64 or more possible dates and select a best one, e.g., the earliest. This is a tedious, time consuming, and error-prone process. In most instances, the organizer would try a few of the 64 combinations and then either give up or settle for a date that is not optimal.

Even if the organizer perseveres through 64 manual combinations, there still may be no proposed date that is sufficiently before the scientific convention to allow the issue of interest to be addressed and acted upon. The current systems do not resolve conflicts, e.g., the current systems do not identify which group or groups are most responsible for causing the greatest delay and do not offer to management an approach to resolve the conflict.

For some conferences, location matters. For example, for conferences in which participants are to meet face to face, the participants need to convene at the same location. An opening in a person's schedule on the same day does not allow the conference to be held if those persons are separated geographically such that they cannot travel to and from the meeting within the open time window. For example, an in-person meeting scheduled for an available morning time slot can not be conducted if one person is in California and the other is in New York. This information is not available in extant scheduling systems.

Even meetings held using teleconferencing equipment might depend on location in that not every location where potential attendees reside has appropriate teleconferencing equipment. The location of the persons relative to the location of the teleconferencing equipment should also be considered, and this information is not available in extant scheduling systems.

Furthermore, even if persons for a teleconference are appropriately located near teleconferencing equipment, that equipment may not be configured for the particular teleconference. For example, there may teleconferencing equipment available in a New York City office, a San Jose Calif. office and a San Diego office capable of supporting a planned audio-video teleconference among those three offices. However, it might be the case that the New York City office equipment is configured for teleconferencing using voice only with offices in London, Antwerp, Paris, Munich and Milan; while the San Jose office equipment is configured for video teleconferencing only with a Tokyo office. The reservation of a conference bridge with the correct bandwidth and number of ports and the assignment of a toll-free number (e.g., area codes of 800, 866, 877, 888) or internet address and meeting code must all be performed to connect the New York and San Jose offices to each other. This task usually falls on the organizer or an agent of the organizer using an entirely separate teleconference configuration application.

The bandwidth demands of voice and data transfers are vastly different from each other and from a complete multi-media teleconference (including audio, video, chat and data). Chat, widely used in the art of remote communications includes any near real-time exchange of data, such as text, between two communicating parties. A multi-media conference between the New York, San Jose and San Diego offices requires not only reconfiguration of the office equipment at those locations but also reconfiguration of the network to provide sufficient quality of service along paths among network nodes between the three offices conducting the teleconference. If not enough bandwidth is reserved, applications run slowly, which can render time-sensitive applications like live voice and live video useless. If too much bandwidth is reserved, valuable resources are wasted.

Clearly, there is a need for a conference scheduling system that does not suffer the deficiencies of current conference scheduling systems.

The approaches described in this section could be pursued, but are not necessarily approaches that have been previously conceived or pursued. Therefore, unless otherwise indicated herein, the approaches described in this section are not to be considered prior art to the claims in this application merely due to the presence of these approaches in this background section.

SUMMARY OF THE INVENTION

Techniques are provided for scheduling conferences based on location data. These techniques include receiving quorum data and location data. These techniques allow location data to include presence data that describes a current actual location of a person; and therefore these techniques allow presence data to be used in determining where to conduct a conference and when. For example, an organizer of a meeting and meeting invitees can be notified when the people constituting a quorum cross paths at the same location, or are currently situated within reach of sites or equipment that support remote conferencing.

In a first set of embodiments, a method for scheduling a conference among multiple persons includes receiving quorum data and location data. Quorum data indicates a quorum for a particular conference. Location data indicates locations of persons who satisfy the quorum. One or more proposed locations for the particular conference s determined based on the location data and the quorum data.

In some embodiments of this set, receiving location data includes receiving presence data that describes a current location of a person; and determining the proposed location includes determining one or more locations based on the presence data. In some of the embodiments using presence data, determining a proposed location for the particular conference includes determining one or more locations for an ad-hoc conference near the current time. In some other embodiments using presence data, determining a proposed location for the particular conference includes determining a proposed time for the particular conference when all persons who satisfy the quorum are located within the same vicinity based on the presence data and choosing as the proposed location a location in the same vicinity. In some other of these embodiments, determining the proposed location for the particular conference includes receiving data indicating a particular set of one or more vicinities, and determining a proposed time for the particular conference based on the presence data when all persons who satisfy the quorum are located within the particular set of vicinities.

In some embodiments of the first set, receiving location data includes receiving planned location data that indicates a planned location for a person for a future time; and determining the proposed location includes determining the proposed location based on the planned location data. In some of these embodiments, determining the proposed location for the particular conference includes receiving data indicating a particular set of one or more vicinities, and determining the proposed time for the particular conference based on the planned location data when all persons who satisfy the quorum are located within the particular set of vicinities.

In some embodiments of the first set, determining the proposed location for the particular conference includes determining multiple locations that support remote conferencing among the persons who satisfy the quorum. In some of these embodiments, a network node is configured based on the multiple locations to support remote conferencing among the persons who satisfy the quorum.

In some embodiments of the first set, invitation data that indicates the proposed location for the particular conference is sent to the persons who satisfy the quorum.

In a second set of embodiments, a method for scheduling a conference among multiple persons includes receiving quorum data and availability data. The quorum data indicates a quorum for a particular conference. Availability data indicates availability of a plurality of persons who satisfy the quorum for attending the particular conference. A proposed plurality of locations that support remote conferencing among the plurality of persons for the particular conference is determined based on the availability data and the quorum data. One or more network nodes are configured based on the plurality of locations that support remote conferencing among the plurality of persons who satisfy the quorum.

In a third set of embodiments, a method for scheduling a conference among multiple persons includes receiving quorum data, availability data. The quorum data indicates a quorum for a new conference. The availability data indicates availability of persons who satisfy the quorum and whether a particular person can communicate remotely at a time within a duration of a previous commitment for that person. A time is determined for the new conference with the particular person during the previous commitment. The new conference is conducted using remote communications with the particular person.

In other sets of embodiments, computer readable media and systems perform the steps of the above methods.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
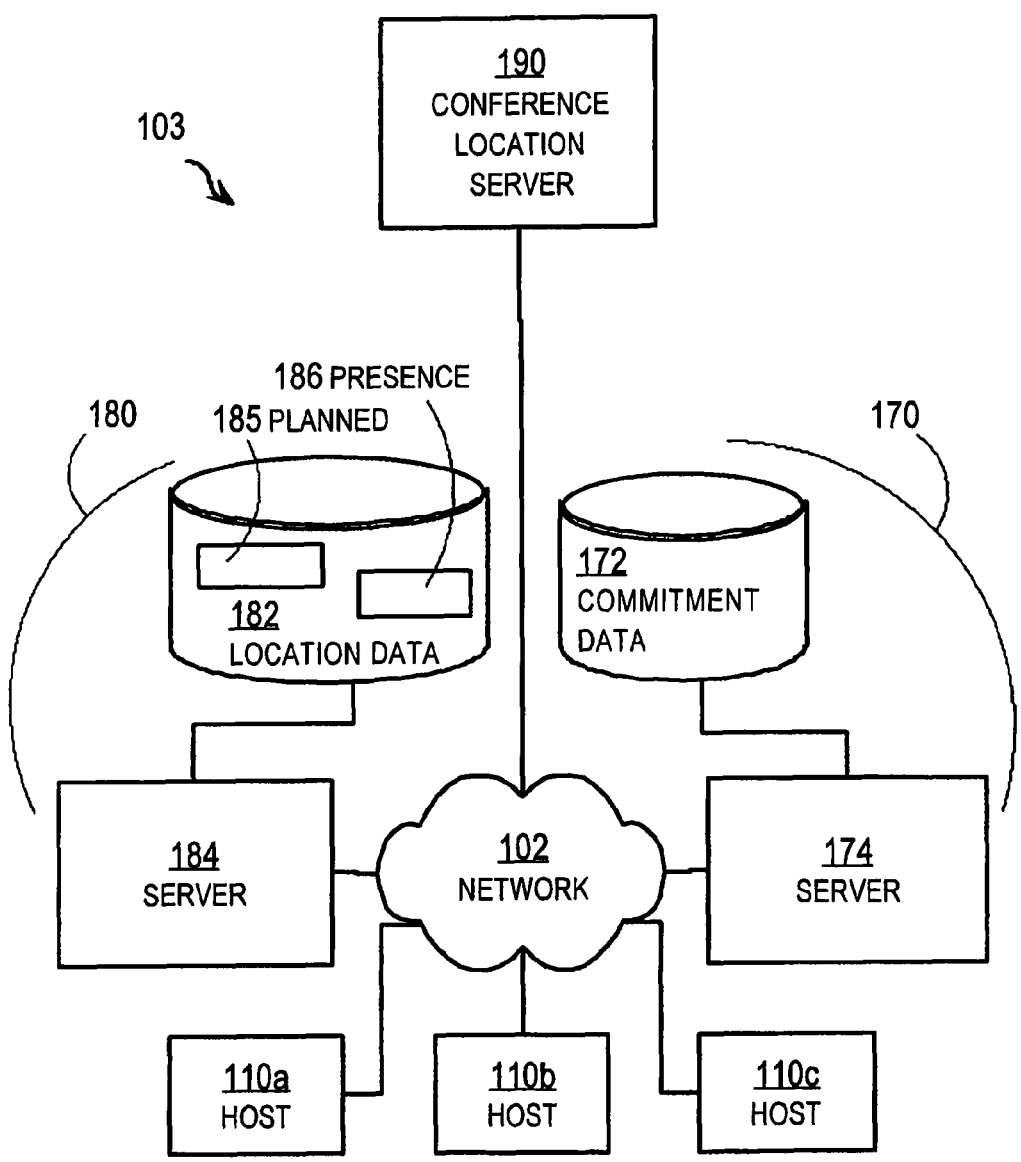
FIG. 1 is a block diagram that illustrates a system with data and servers for scheduling a conference, according to an embodiment.

A method and apparatus are described for scheduling a conference. In the following description, for the purposes of explanation, numerous specific details are set forth in order to provide a thorough understanding of the present invention. It will be apparent, however, to one skilled in the art that the present invention may be practiced without these specific details. In other instances, wellknown structures and devices are shown in block diagram form in order to avoid unnecessarily obscuring the present invention.

Embodiments of the invention are described in the context of using data from an electronic calendar, but the invention is not limited to this context. In other contexts, other data may be used instead of or in addition to data from an electronic calendar, such as flat files or databases of scheduled conferences and attendees, of electronic personnel travel requisitions, of data describing communication devices assigned to or associated with personnel, of data indicating the presence of a user on a network (called herein "presence data") including a wireless network, a large area network, the Internet or a cellular telephone network, and of data indicating resources scheduled for a conference, such as network equipment, conference room, and conference room equipment.

Presence data is used in several extant and emerging applications. For example, in instant messaging applications, such as AOL Instant Messenger (AIM) from America Online of Dulles, Virginia and Presence Works of Presence Works, Inc in Alexandria Va., presence data indicates the instantaneous knowledge that someone is available online and reachable via instant messaging. More broadly, presence data indicates a dynamically changing set of channels, capabilities, characteristics, preferences and ability for persons to communicate and interact with each other at the current time. See for example at the website of the Internet Engineering Task Force (IETF) found at domain ietf.org, request for comments (RFC) 2778, the entire contents of which are hereby incorporated by reference as if fully set forth herein. Presence data includes such communicative states of availability as "online," "offline," "do not disturb," "at lunch." Some applications consider other availability information as presence data, including information that indicates, for a particular person, "try mobile phone first, then business line", "always send e-mail" or "unavailable for conference calls, but available for webcasts." In some applications, presence data may include physical location of the person such as "on travel in London," or "at home," or "in office" or "at company headquarters," as well as a network address. In some applications, presence data indicates people on the same (virtual) location like a web page or a shared document. In some applications, presence data indicates people who are within the same cell (the geographical area covered by a cellular phone antenna). In some applications, presence data indicates location of a person or facility based on a positioning system, such as the Global Positioning System (GPS) widely used in commerce and by the military. As used in the following, presence data indicates the geographic location or communicative state, or both, for a person at the current time and includes all sources of such information, no matter how precise or reliable, including a person's planned location or communicative state in a calendar database for the current time.

1. Structural Overview

FIG. 1 is a block diagram that illustrates a system 103 with data and servers for scheduling a conference using location data, according to an embodiment. The system 103 includes a network 102, hosts 110a, 110b, 110c (collectively referenced hereinafter as hosts 110), a commitment data system 170, such as an electronic calendar, a locations data system 180, and a conference location server 190.

The client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple servers on multiple hosts (sometimes called tiers) for reasons that include reliability, scalability, and redundancy, but not limited to those reasons.

The network 102 is any network that connects a variety of users of host computers, including, but not limited to, local area networks (LANs), wireless networks, wide-area networks (WAN), the Internet (a network of heterogeneous networks using the Internet Protocol, IP), and virtual private networks. In an embodiment using a single stand alone computer, network 102 may be omitted.

The hosts 110 are computers to which a population of potential participants in conferences (the "conference population"), or their human agents such as secretaries and assistants, have access. The hosts are connected to network 102. For the purposes of illustration, three hosts 110a, 110b, 110c are shown in FIG. 1. In other embodiments more or fewer hosts are connected to network 102. In an embodiment using a single stand alone computer, only one host, e.g., host 110a, is used.

The system 103 includes a commitment data system 170, which includes a server 174 and commitment data 172 on one or more storage devices. The server 174 controls the storage and retrieval of commitment data 172. For purposes of illustration, server 174 is shown separate from hosts 110; but in some embodiments, server 174 resides in part or in whole on one or more of hosts 110. Furthermore, for purposes of illustration, one server 174 is connected to one storage device with commitment data 172; but in other embodiments, the commitment data may be distributed over several data storage devices connected directly to one or more servers like server 174, or connected indirectly to one or more servers through network 102. Any system known in the art may be used as commitment data system 170, such as a calendar database system. In various embodiments, system 103 includes more or fewer commitment data systems like system 170. In some embodiments, a commitment data system 170 is omitted.

Calendar data typically includes one or more data structures that hold data indicating a person from the population and zero or more commitments of time for that person, including data indicating a start date and time and stop date and time for the commitment. The commitment of time may be for a conference or for travel or for personal activities such as vacation and bereavement. In some embodiments, a description of the commitment, or a location associated with the commitment, or both, are included in the calendar data for each commitment.

In some embodiments, a role for the person during the commitment is also included. For example, in some embodiments, the commitment data indicates a role that the person has for the conference, such as a speaker at a conference, an in-person passive participant at a conference, a remote participant at a conference, or a traveler en route to a destination. The role implies, and therefore indicates, a mode of communication used during the commitment. For example, a speaker is not available for other modes of communication; an in-person participant is not available for other in-person meetings but might be available for remote text. In some embodiments, the mode of communication for the conference is explicitly included in the availability data. Modes of communication include in person communication and remote communication using any devices associated with the person. In some embodiments, the role or explicit mode of communication is used to double book during the commitment, so that, for example, a person who is an in-person passive participant can still receive text as a remote participant in a different conference. Similarly, a person who is committed to a remote text conference is still available for conference as an in-person passive participant.

The system 103 includes location data system 180, which includes a server 184 and location data 182 on one or more storage devices. The server 184 controls the storage and retrieval of location data 182. For purposes of illustration, server 184 is shown separate from hosts 110; but in some embodiments, server 184 resides in part or in whole on one or more of hosts 110. Furthermore, for purposes of illustration, one server 184 is connected to one storage device with location data 182, but in other embodiments, the location data may be distributed over several data storage devices connected directly to one or more servers like server 184, or connected indirectly to one or more servers through network 102. Any location data system for the location of persons or facilities known in the art may be used as location system 180.

Location data 182 includes planned location data 185 or presence data 186, or both. Planned location data 185 indicates the planned future location of a person or equipment. Presence data 186 indicates the location or communicative state of a person or equipment at a current time.

A location data system 180 is any system that includes data that indicates the location or communicative state of one or more persons in the conference population or the location of various equipment and facilities that are used to conduct conferences. Location data systems 180 include systems that generate or utilize presence data 186, such as a system that associates a cell phone that has a particular cell phone number belonging to a person with a particular cell in an array of cells that span a coverage area, as is described in greater detail in a later section. Location data systems include systems that use planned location data 185, such as a travel request processing system or a human resources employee leave processing system, or a portion of a calendar database system that includes the locations associated with one or more commitments. In some embodiments, a communications channel for the person during a future commitment is also included in location data. For example, in some embodiments, the communications channel data indicates that the person is available for receiving cell phone calls at a particular cell phone number, or text messages at a particular instant message 10, or email, or other data, such as a slide presentation, at an email address, or some combination during the commitment. In various embodiments, system 103 includes more location data systems like system 180. In some embodiments, one or more servers like server 184 are embedded in commitment data system 170, such as a calendar database system that includes location data with scheduled commitments.

The system 103 includes a conference location server 190. The conference location server 190 determines the location and zero or more other properties of a conference, such as time and invitees. For purposes of illustration, conference location server 190 is shown separate from hosts 110 and servers 174, 184; but in some embodiments, conference location server 190 resides in part or in whole on one or more of hosts 110 or on a host with other depicted systems 170, 180 or as part of servers 174, 184. In some embodiments, the conference location server 190 may be distributed over several hosts connected to network 102.

2. Functional Overview

According to some embodiments of the invention, location data is used to schedule or conduct conferences or both In some embodiments, conference times are selected based on the locations of persons who establish a quorum. In some embodiments, all persons who establish the quorum are required to be in the same location, but that location is arbitrary. In some embodiments, all persons who establish the quorum are required to be in a particular location. In some embodiments, all persons who establish the quorum are required to be in a set of two or more locations, which can be connected by remote conferencing technology. In some embodiments, all persons who establish the quorum are required to be in a set of one or more communicative states which support remote conferencing. In some embodiments, the conference location server 190 configures equipment to support the remote conferencing.

3. Example Embodiment

Figure 2:
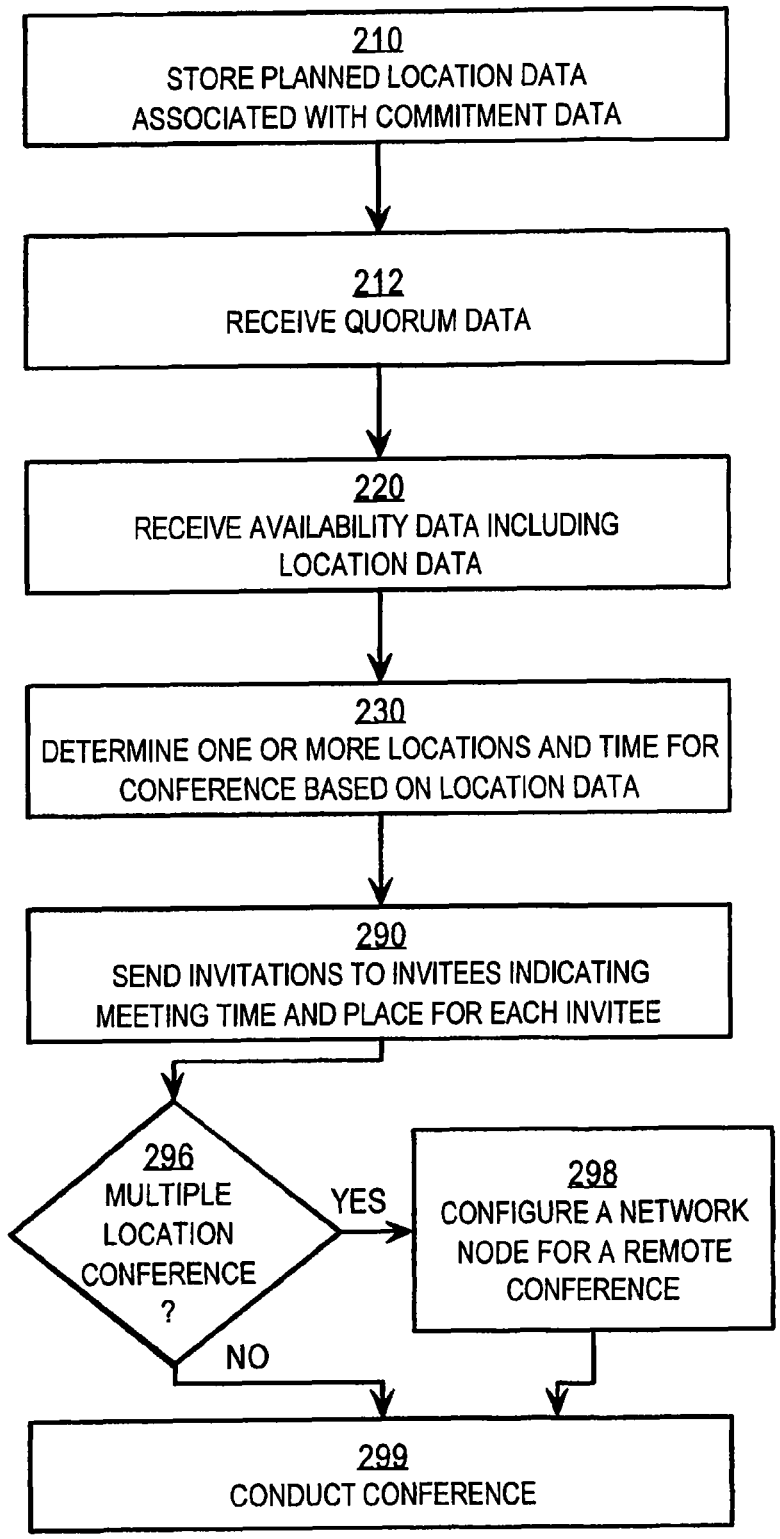
FIG. 2 is a flow diagram that illustrates a method for scheduling a conference, according to an embodiment.

To illustrate a method according to the present invention, an example embodiment is described. FIG. 2 is a flow diagram that illustrates a method 200 for scheduling a conference, according to an embodiment. Although steps are indicated in a particular order in FIG. 2, in other embodiments, the steps may be performed in a different order or overlapping in time. For example steps 210 through 220 may be performed in any order or may overlap in time. In addition, in some embodiments one or more steps may be omitted.

In step 210, planned location data is stored in association with commitment data. For example, a calendar database for scheduling meetings is modified to use data structures with a data field for storing a location for the meeting. In some embodiments, a database of videoconference room locations is maintained in association with scheduled uses of the rooms. In some embodiments, data that indicates a role played by the person during the commitment or an explicit mode of communication used by the person during the commitment is also stored in the commitment data. For example, data is stored in association with the commitment that indicates the person is a speaker unable to transmit or receive data for the duration of the commitment. As a further example, data is stored in association with the commitment that indicates the person is a passive participant able to receive text, or cell phone calls, or emails, or multi-media data, or some combination. As a further example, data is stored in association with the commitment that indicates the person is a traveler during the committed time and is able to receive and initiate text, or cell phone calls, or emails, or multi-media data, or some combination As a further example, data is stored in association with the commitment that indicates the person is committed using text messaging and is still able to attend another conference using other modes of communication, including an in-person conference that allows the person to receive and send text. In some embodiments, step 210 is omitted.

In step 212, quorum data is received. Sufficient involvement by persons from the conference population to hold a conference is a quorum for the conference. According to embodiments of the invention, a quorum of two or more persons for a conference is defined based on having one or more members from each of one or more groups. In some embodiments, a quorum is defined based on having one or more members from each of one or more representative groups, without requiring all members from any representative group. By using representative groups to define a quorum, it is easier to avoid conflicts. A person attempting to schedule a meeting determines the type of expertise or authority that is important to conduct the business of a conference, and identifies two or more persons from the conference population that provide one or more desired expertise or authority. Those two or more persons for a desired expertise or authority constitute a representative group for the conference. A quorum can be defined by a combination of groups and a minimum number of members to attend from each group. Predefined groups may be used, such as departments or job classifications or email lists or combinations of these.

Any method may be used to receive the quorum data, including, but not limited to predefined data stored within source code or in files stored with executable code ("default values") or in files or a database accessible to the process, organizer input either in response to prompts from the process or independently of prompts, or from data included in a message sent to the system 103 by another server or from a client process, such as a client process on a host 110 operated by an organizer.

The quorum data indicates one or more groups and the minimum number of persons from each group. A group for which a minimum of zero members make a quorum is called an optional group; all its members are optional attendees. One optional group with optional attendees is used in some commercial systems. A group for which a minimum of all members make a quorum is called a mandatory group. One mandatory group of attendees is used in some commercial systems. A group with a minimum of one or more members but less than all the members of the group is called a representative group. At least one member attends to represent each of these groups, but the entire group need not attend. Such representative groups are described in more detail in Ethier, cited above.

In step 220, availability data including at least some location data and sometimes the commitment data is received for the persons who make up a quorum. For example, in some embodiments planned location data is received in step 220 from a calendar database that includes locations associated with commitments. In some embodiments, time commitments for personnel and facilities are received from commitment data 172 managed by a calendar database, and planned location data 185 is received from a separate server 184 that stores planned location data 185 associated with corresponding commitments in the commitment data 172. In various embodiments, step 220 includes receiving presence data 186 from server 184 in addition to or instead of the planned location data 185.

In some embodiments, step 220 includes receiving data that indicates communication addresses for one or more persons in the quorum. These communication addresses include, but are not limited to, postal addresses giving living or working geographic locations, equipment identification numbers such as landline and wireless telephone numbers and fixed network addresses of desk top computers, instant message identities, network user identities, or some combination. In some embodiments, step 220 includes receiving data that indicates equipment assigned to one or more persons in the quorum. These data indicate, for example, whether the person has a laptop computer or personal digital assistant (PDA) or cellular telephone or some other portable device, and whether that device includes microphone, audio or vibration alarm, speaker, text display, video display, digital video camera, GPS capability, or other features, or some combination.

As described in Ethier, multiple combinations of persons from representative groups make up multiple possible quorums. In step 220 the availability data for one or more of these combinations is received.

Any method may be used to receive the availability data, such as listed above for receiving quorum data, including, but not limited to data in files or a database accessible to the process, user input either in response to prompts from the process or independently of prompts, or from data included in a message sent to the conference location server 190 by another server or from a client process, such as a client process on a host 110 operated by a user or the organizer.

For example, in some embodiments a commitment server 174 accesses data directly from the commitment data 172 and a location server 184 accesses data directly from location data 182, including both planned location data 185 and presence data 186. In some embodiments, a separate conference location server 190 sends a query message to commitment data server 174 to retrieve data from the commitment data 172 and receives availability data in a return message. In some embodiments, conference location server 190 sends a query message to server 184 to retrieve data from location data 182 and receives location data in a return message. In some embodiments, the query message includes data identifying one or more persons in the specified groups or one or more types of remote conferencing to use. In some embodiments, during step 220, a query message includes data identifying one or more persons in a combination that satisfies a quorum.

Figure 3:
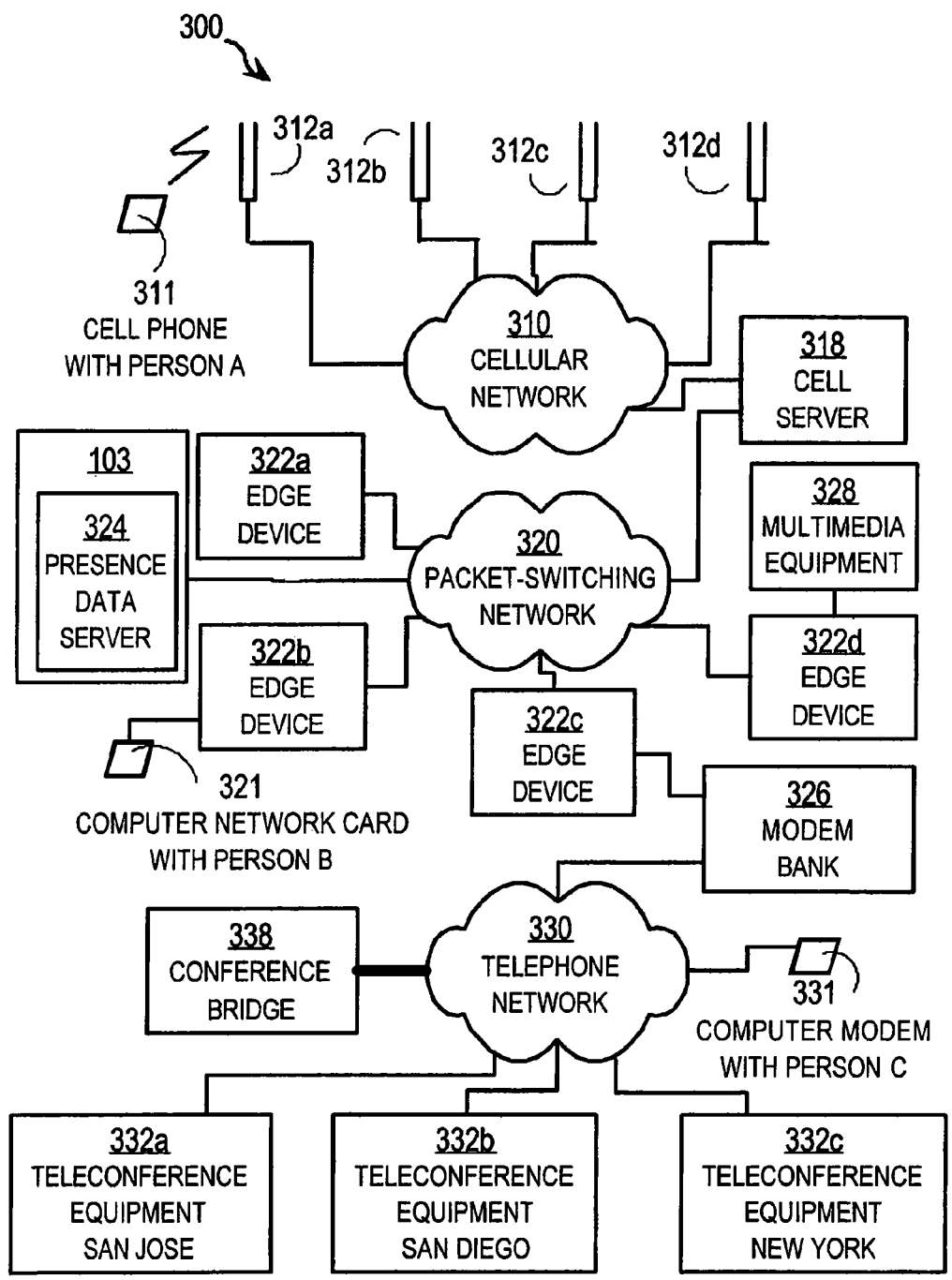
FIG. 3 is a block diagram that illustrates a system for using presence data, according to an embodiment.

FIG. 3 is a block diagram that illustrates a system 300 for using presence data, according to an embodiment. System 300 includes the conference location system 103, a cellular telephone network 310, a packet switching network 320, such as the Internet, and a telephone network 330, which is an example of a circuit-switching network.

Connected to the cellular telephone network 310 are radio antennas 312a, 312b, 312c, 312d (collectively referenced hereinafter as antennas 312), which each provide wireless communications with mobile telephone units called cell phones within a certain geographic area called a cell. A cell area is often on the order of a few square kilometers ($km^2$). Although four antennas 312 are shown in FIG. 3 for purposes of illustration, in other embodiments the cellular network 312 includes many more antennas spanning a large number of densely populated and densely traveled geographic areas. A cell phone communicates with an antenna 312. For example, cell phone 311, in the possession of a person designated herein as person A, communicates with antenna 312a. Also connected to cellular network 310 is a cell system server 318 on a host (not shown). The cell system server 318 receives and manages information about which cell phones are communicating with which antenna 312.

Packet-switching network 320 includes network edge devices 322a, 322b, 322c, 322d (collectively referenced herein as edge devices 322). Edge devices 322 are network devices such as hubs, switches and routers, both cabled and wireless, to which network interface devices are connected, such as network interface cards (NICs) in host computers. For example, computer network interface card 321, in a computer in the possession of a person designated herein as person B, is connected to edge device 322b. Similarly a host with multimedia equipment 328 is connected to edge device 322d, and bank of modulators/demodulators (modems) for telephone signals designated modem bank 326 is connected to edge device 322c. Although four edge devices 322 are shown in FIG. 3 for purposes of illustration, in other embodiments the packet-switching network 320 includes more or fewer edge devices 322.

Also connected to packet-switching network 320 is the conferencing system 103. Presence data server 324 is an embodiment of a location data system 180 within conferencing system 103, described above.

The telephone network 330 is connected to landline telephone units (not shown) such as ordinary telephone handsets. In addition, one or more computer hosts use the telephone network 330 by means of a modem. For example, modem 331, in a computer in the possession of a person designated herein as person C, is connected to telephone network 330. Also connected to telephone network 330 is teleconferencing equipment for remote conferencing using the telephone network 330. Teleconferencing equipment includes conference bridge 338, and teleconference equipment such as 332a, 332b, 332c located in San Jose, San Diego and New York, respectively.

According to the illustrated embodiment, the location data server 184 depicted in FIG. 1 includes the presence data server 324 connected to the packet-switching network 320 in FIG. 3. The presence data server 324 collects and manages presence data for persons who make up one or more of the possible quorums. Any method for passing presence data to server 324 may be used. Currently there is a new IETF group working on a standard for the transmission of location information over the internet. For example, see at the ietf.org website draft-ietf-geopriv-pres-01 for "A Presence Architecture for the Distribution of Geopriv Location Objects;" draft-ietf-geopriv-pidf-lo-02 for "A Presence-based GEOPRIV Location Object Format;" and draft-ietf-geopriv-policy-02 for "Format for Expressing Privacy Preferences for Location Information."

For purposes of illustration, it is assumed that persons A, B and C constitute one possible quorum for an conference, so their locations affect whether and where such a conference can be convened. Thus presence data server 324 obtains presence data for persons A,B,C.

In the illustrated embodiment, presence data server 324 communicates with cell server 318 to determine the location of antennas communicating with cell phones belonging to persons who make up the quorum. For this example, it is further assumed that location data 182 includes cell phone numbers for persons who are users of the conferencing system 103. Thus presence data server 324 determines the particular cell phone numbers for members of the quorum. In this embodiment, the presence data server 324 includes a client process for the cell system server 318. The client process sends a request to cell system server 318 for the location of any antenna communicating with any of the particular cell phone numbers. Any method may be used by the cell system server 318 or the system 103 to associate cell phone 311 with a phone number, including the use of the electronic serial number (ESN) or the international mobile equipment identity (IMEI) of the cellular phone. In response, cell system server 318 sends to the client process in presence data server 324 a message that indicates the location of antenna 312a that is communicating with cell phone 311 having one cell phone number on the list. For purposes of illustration it is assumed that antenna 312a is located in a certain part of New York City. Presence data server 324 determines that the one number belongs to person A and therefore that person A is currently in that certain part of New York City.

In some embodiments, the presence data is indicative of a person's location or communicative state at the current instant. In some embodiments, the presence data is indicative of a person's location or communicative state for any instant within a window of time useful for the purposes of organizing and conducting a meeting, such as a six hour or longer window. In some embodiments, the cell system server 318 retains data about communications with cell phones for an extended time of several hours. In such embodiments, the location of all antennas that communicated with the cell phone 311 over those several hours is returned. Presence data server 324 can determine, based on that data, whether person A is stationary in one location in New York City or is traveling through New York City toward a particular direction. For purposes of illustration it is assumed that person A is stationary in one location in New York City. In some embodiments in which location data is not already associated with commitment data, the presence data is taken to indicate a person's location for the duration of the commitment that overlaps the current time. For example, if the current time is part of a 3-hour commitment scheduled for person A, then the New York City location is also associated with that commitment for the three hours.

In the illustrated embodiment, presence data server 324 communicates with network routing devices in packet-switching network 320 to determine the location of edge devices 322 connected to equipment belonging to persons who make up the quorum. For this example, it is further assumed that location data 182 includes user identification codes (user IDs) and NIC identification codes, such as machine access codes (MACs), for persons who are users of the conferencing system 103. Thus presence data server 324 determines the particular user IDs for members of the quorum and NIC MACs for equipment belonging to the members of the quorum. The presence data server 324 sends a request for the location of any edge device 322 passing data packets that carry the user ID or MAC ID on a list of user IDs and MAC IDs for members of the quorum. In response, presence data server 324 receives a message that indicates that edge device 322b is communicating with a NIC having a MAC ID on the list. For purposes of illustration it is assumed that edge device 322b is a router located in San Jose on an enterprise network. Presence data server 324 determines that the MAC ID is associated with person B and therefore that person B is currently in San Jose. In this example, the physical location of a non-mobile device is used to determine the current physical location of a user when that user is present on that device. In some embodiments, the physical location of non-mobile devices are known when the devices are provisioned for the network, and therefore the physical location is made known to a presence server.

It is further assumed for purposes of illustration that presence data server 324 receives a message that indicates that edge device 322c authenticated a user having a user ID on the list. For purposes of illustration it is assumed that edge device 322c is connected to modem bank 326 for receiving modulated signals on local telephone calls in San Diego. Presence data server 324 determines that the user ID belongs to person C and therefore that person C is currently in San Diego.

Returning to the method depicted in FIG. 2, during step 220, the server 190 receives presence data, if any, as described above with respect to FIG. 3. During step 220, or in another step (not shown) in another embodiment, the conference organizer may specify properties of the conference. In various embodiments, the other properties include a duration for the conference and a description of a topic for the conference. In some embodiments, the organizer specifies limits on the values of the properties such as a limit on the dates for holding the conference, a time of day, a language, or a travel cost, as described in Ethier . . . .

In step 230, the process determines a proposed location for the conference. In some embodiments, step 230 includes receiving data that indicates the type of remote conferencing that is appropriate, e.g., whether data, audio, video or multimedia remote conferencing equipment will be used, or whether a circuit-switching network or a packet-switching network is to be used. The type of remote conference may affect the locations where the conference can be held; for example, an audio telephone conference can be held at locations where a telephone is available and a data packet-switching conference can be held at locations that support an Internet connection. However, an audio-video teleconference can only be held at facilities with cameras and large bandwidth telephone connections. A remote conference using data packets carrying voice data for live transmission (a process called "voice over IP") can only be held at facilities with microphones and large bandwidth internet connections configured to support voice over IP. In some embodiments, the type of remote conference is determined during step 230 based on the devices in the possession of the participants, such as determined using presence data. In some embodiments, the conference organizer specifies a range of one or more types of communication devices that are acceptable for conducting the conference.

In some embodiments, a time for the conference or locations and times for one or more alternatives are also determined during step 230. If a proposed location and time are not possible to satisfy the quorum and any constraints on the conference, a conflict arises. Any response to the conflict may be employed, including sending a failure message to the organizer or resolving the conflict using any resolution process known in the art.

If such proposed times are possible, step 230 includes determining a list of the available persons that satisfy the quorum at the proposed location with or without determining other properties of the conference, such as the time of the conference. In the preferred embodiment, step 230 includes determining one or more times for conducting the conference. In some embodiments, step 230 includes having the organizer specify the location or locations for the conference, such as a preferred meeting place or locations that support videoconferencing. In embodiments in which the organizer specifies the location or locations, step 230 includes determining the time or attendees that satisfy the quorum for the specified locations.

In an example of the illustrated embodiment, during step 230, the location server 190 determines to hold the conference involving persons A, B, C as a teleconference using teleconferencing equipment located in San Jose, San Diego, and New York, where the presence data indicates persons A, B, C are currently located. It is assumed for purposes of illustration that data indicating the addresses and room numbers of the teleconferencing equipment in those cities is available in the location data 182. In the illustrated embodiment, location server 190 also requests commitment data from commitment server 170 to determine that persons A, B, C and the rooms where the teleconferencing equipment is located are available as of six o'clock post meridian (PM) eastern standard time (EDT) on the current day.

In step 290, invitations are sent to alert persons who make up the quorum, and any optional persons, about the selected conference location (and sometimes a proposed time). In some embodiments, step 290 is omitted. In some embodiments, step 290 is performed automatically.

In the illustrated embodiment, step 290 includes sending data about the time and other attendees of the conference and other properties of the conference along with the location of the conference. Persons who are among the combination that satisfies the constraints are notified that their attendance is mandatory for the particular conference, and other persons in one or more groups are also invited to attend. In the example of the illustrated embodiment, messages are sent to persons A, B, C indicating that their attendance is mandatory at a teleconference to be conducted at 6 PM, EST. Person A is directed to call a phone number, or proceed to the address and room, for teleconference equipment 322c in New York City. Person B is directed to proceed to the address and room of teleconference equipment 322a in San Jose. Person C is directed to proceed to the address and room of teleconference equipment 322b in San Diego.

In some embodiments, the invitation sent in step 290 is delivered based on the presence data. For example, because person A is using a cell phone not a computer connection, the message to person A is sent as a text message to the cell phone 311. Because persons B and C are using computers, their messages are sent as email or instant messages, or both, using corresponding addresses associated with each person.

Once a person is sent an invitation, in many embodiments that person has the option of rejecting the invitation. In some embodiments, step 290 includes a step in which it is determined whether a mandatory participant for a selected conference time rejects the invitation. If so, control passes back to step 230 to automatically determine the next alternative that meets all of the criteria for the meeting (the next alternative may include the same mandatory participant but at a different time). In some embodiments, the organizer (i.e., the owner of the meeting) is informed of the rejection and the next alternative so that the organizer can review the change before the previous invitation is withdrawn and the alternative is propagated to the new mandatory and optional attendees. If no alternative remains after a rejection, a conflict arises. The response to a conflict is described above.

If the invitees that make up a quorum accept the invitations, control passes to step 296. Step 296 represents a branch in the flow. If a multiple location conference has been organized, control passes to step 298. Otherwise control passes to directly to step 299. In step 299, the conference is conducted.

In step 298, a network is configured to support remote conferencing. For example, to support a telephone videoconference over a telephone system circuit-switching network, telephone equipment is configured to support the videoconference. Any known method may be used. For example, the conference bridge 338 is reserved for the time of the conference, a toll free telephone number is assigned for the conference, and a number of ports for the bridge is determined, based on the number of remote sites that call into the videoconference. In some embodiments, step 298 is performed manually using different systems. In some embodiments, step 298 is performed by location server 190.

To support a packet-switching network remote conference, network equipment is configured. For example, to support voice over IP between persons B and C, edge devices 322b, 322c and intervening network devices (not shown) are configured to support voice over IP. To support packet-switching video-conferencing between multi-media equipment 328 and other multi-media equipment (not shown), edge device 322d and other intervening network devices (not shown) are configured to support videoconferencing. Any known method may be used. In some embodiments, step 298 is performed manually using different systems. In some embodiments, step 298 is performed by location server 190.

In an embodiment that sets up the remote conferencing automatically, server 190 includes a client process for a server (not shown) that manages the remote conferencing equipment. For example, to support a telephone videoconference over a telephone system circuit-switching network, telephone equipment is configured to support the videoconference. For example, general purpose electronic conferencing (GPEC) systems allow an organizer to reserve teleconference equipment, e.g. PROS HARE™ manufactured by Intel Corp of Santa Clara Calif. and AT&T's WORLD WORX$^{SM}$ Service support reserving International Telecommunication Union—Telecommunication Standardization Sector (ITU-T) H.320, Narrow Band Visual Telephone System and Terminal Equipment. In some embodiments, the conference bridge is configured to call the attendees at the appointed time, rather than waiting for the attendees to initiate the calls.

To support a conference using a packet-switching network, such as the Internet, the network devices are configured to support the remote conference. For example to support voice over IP the network devices, such as endpoints (terminals), media gateways, multipoint processors, multipoint control units, hubs, switches, routers and mixers are configured to process these packets in a special way, allowing enough bandwidth and priority so that these packets arrive at their destination node in a timely fashion. User agents, proxies, softswitches, media gateway controllers, gatekeepers, call control agents, service control agents, multipoint controllers, and related network elements send signals among themselves to establish, maintain, and release voice sessions. Similar concerns apply for live video feed over the interne. Any standard known at the time system 103 is implemented may be used to support voice, live video or multi-media data over IP, including International Telecommunication Union(ITU) H.323, and the IETF Session Initiation Protocol/Session Description Protocol (SIP/SDP; see IETF RFC-3261, RFC-2327), and other emerging standards.

In an embodiment that sets up the remote conferencing automatically, server 190 includes a client process for a server (not shown) that manages the configuration of packet-switching network devices. Any network configuration management system may be used. For example, the server 190 may use a client for Cisco Works for management of network resources, or a client for Cisco Application Oriented Networking System (AONS) for configuration of network resources, or both. Both Cisco Works and AONS are available from Cisco Systems of San Jose, Calif. to network administrators. In some embodiments the system, e.g., server 190, knows how much information it will have to transmit between its nodes and makes bandwidth reservations based on Reservation Protocol (RSVP) or a similar protocol to ensure the users will have a good experience throughout their conference.

In other embodiments, new or emerging systems may be used in step 298. In some embodiments the configuration of network devices is based on the number and locations of participants in a remote conference, such as provided by conference location server 190.

For example, the network devices are configured to minimize a number of links between the locations to reduce overall traffic demands on the network. To illustrate this example, it is assumed that 5 conference participants are scattered around San Francisco and 3 participants are scattered about New York City. In the illustrated example, the conference location server 190 causes a central New York City (NYC) media resource to establish a connection to a San Francisco (SF) media resource; and the dialed connections (dial-out or dial-in) would be established locally. There would be 3 local calls between the NYC media resource and the 3 NYC participants, and 5 local calls between the SF media resource and the 5 SF participants. If one of the participants is in, or travels to, another location, e.g., Miami, Fla., then one of the media resource centers supports a dialed connection to Miami based on which connection is least costly (monetary or other measure of cost). If multiple participants join in Florida, then a new media resource, e.g., in Miami, is used for local access to the Florida participants, and a single, least costly connection is made between Miami and one of the other sites—NYC or SF.

In some embodiments, one or more of the participants are equipped with wireless mobile technology. Some such devices include, but are not limited to, laptop computers with microphones, digital video cameras and GPS receivers. In such embodiments, the system, e.g., server 190, determines the most appropriate and available network endpoint devices, such as audio, video and data mixers to produce the combined signal to be transmitted over a wireless connection to the mobile device.

In some embodiments, the configuration is performed based on the presence data. For example, if person A is using a cell phone and not a computer connection for the remote conference itself, then the communications with A are based on the properties of the cell phone. In some embodiments, these properties are determined based on location data. In some embodiments, these properties are based on negotiations between the device and the system, e.g., server 190. For example, the system determines that the cell phone has a video display and a digital camera and downloads a picture of the caller A for using as a video feed during a conference call with the other conference attendees when person A is speaking. In such embodiments, similar negotiations are conducted with other devices, such as computers used by persons B and C. In this way a multipoint, multi-media remote conference can be held that involves text and data (e.g., slides) among persons using different and mobile equipment. For example, if person C is using a laptop without a microphone or speaker, words spoken by persons A and B can be directed to a speech recognition application on the network and converted to text that is sent to the laptop of person C.

4. Example Conferences 4.1 Immediate Conference

In some embodiments, the system 103 and method 200 are used to determine where to hold a nearly immediate conference, sometimes called an "adhoc" conference, e.g., a conference sometime during the same day or during the next predetermined number of hours, e.g., 36 hours. An ad-hoc conference can be organized using presence data as described above for the example of persons A, B, and C.

In this example, an organizer determines to hold an ad-hoc conference later the same day. For purposes of illustration, it is assumed that the organizer determines that a quorum is made up of one person from each of three representative groups having five members, four members and seven members, respectively. Using the approach of Ethier, the system 103 determines that there are 5*4*7=140 combinations of three persons that satisfy the quorum, including the combination made up of person A from the first representative group, person B from the second representative group, and person C from the third representative group. During step 212, location server 190 receives the quorum data. The quorum data can be expressed in any way. For example, in some embodiments, the quorum data is expressed as the three representative groups; in some embodiments the quorum data is expressed as the 140 combinations, and in some embodiments, the quorum is expressed as one combination. For purposes of illustration, it is assumed that the quorum data is expressed as data indicating the three representatives groups.

In step 220 availability data is received. For purposes of illustration it is assumed that the availability data includes commitment data for the persons in the three representative groups.

In step 230, one or more locations for holding the ad-hoc conference are determined. It is assumed for purposes of illustration that step 230 includes determining the 140 combinations based on the representative groups and using the commitment data to determine that all combinations but two involve persons with commitments that preclude participating in a conference on the current day. It is assumed for purposes of illustration that the two combinations without prior commitments include persons D, B, C and persons A, B, C.

It is further assumed, for purposes of illustration that step 220 overlaps in time step 230, and that presence data for the persons D, B, C is obtained after that combination is determined to be available. The presence data indicates, as described above with reference to FIG. 3, that person B is in San Jose and person C is in San Diego. In step 230, using location data 182 from location data server 184, location server 190 determines that person B is within the vicinity of a remote conferencing facility supporting telephone videoconferencing that is available in San Jose, e.g., equipment 332a. Similarly, location server 190 determines that person C is within the vicinity of a remote conferencing facility supporting telephone videoconferencing that is available in San Diego, e.g., equipment 332b. It is further assumed for purposes of illustration, that, based on location data 182, location server 190 determines that person D routinely works at a customer site in a rural town in California and has no commitments that would cause person D to be in another location. Location server 190 therefore determines that person D is currently in that rural town. Location server 190 further determines that the rural town is not in the vicinity of any remote conferencing facility, e.g., the rural town is more than a four hour drive from such a facility. Thus, location server determines during step 230 that the combination D, B, C is poorly located to hold an ad-hoc conference.

During step 220, which overlaps step 230, location server 190 receives presence data for the person A from the location data server 184. As described above with reference to FIG. 3, person A is currently present in New York City. During step 230, location server 190 determines that person A is in the vicinity of the teleconferencing equipment 322c that is available in New York City. Thus, location server 190 determines during step 230 that the combination A, B, C is properly located to hold an ad-hoc conference using available remote conferencing equipment 332a, 332b, 332c. In the illustrated embodiment, the system 103 also determines that the time of the ad-hoc conference is 6 PM EST or later.

In step 290, invitations are sent to the invitees, persons A, B, C, that their attendance is needed at an ad-hoc conference that afternoon after 6 PM EST and that they should proceed to the locations where the teleconference will be held. For example, person A should proceed to the address and room where equipment 332c is located; person B should proceed to the address and room where equipment 332a is located; and person C should proceed to the address and room where equipment 332b is located. In some embodiments, during step 290 responses are received from invitees, which indicate some property of the conference is to be changed. For example, person A responds with a request to move the conference to 7 PM EST to accommodate traffic problems in New York City. In some such embodiments, a second message is sent during step 290 to confirm the meeting at the later time.

Because the conference is held in multiple locations, step 296 branches to step 298. In step 298, a network node is configured for a remote conference. For example, telephone conference bridge 338 is configured with six ports for three audio and three video signals and an 800 area-code telephone number is assigned for a one hour meeting beginning at 7 PM EST. In some embodiments in which step 290 overlaps or occurs after step 298, the invitation sent in step 290 includes the 800 area-code telephone number to call to implement the teleconference.

4.2 Co-located Conference

In some embodiments, the system 103 and method 200 are used to determine where to hold a conference in which all participants are located in the same place for an in person meeting, called herein a co-located conference. A co-located conference can be organized using presence data or planned data.

To illustrate a co-located conference using presence data, it is assumed that an organizer wants persons from the same three representative groups described above to hold a co-located conference. This information is received as quorum data by the location server 190 during step 212, as described above.

During step 220, the location server 190 receives availability data. For purposes of illustration, it is further assumed that the presence data does not show any combination in which all three persons are in the vicinity of the same location at the current time.

In step 230, a location for the co-located meeting is determined. If the planned location data 185 shows a future time when persons from all three representative groups are in the vicinity of a particular location, the particular location is returned and control passes to step 290 to send invitations to the invitees. Because only one site is involved, step 296 passes control to step 299; and step 298, to configure a network node, is skipped.

It is further assumed for purposes of illustration that planned location data 185 does not include any future time when persons from all three representative groups are in the vicinity of the same location at the same time. The organizer is informed that the co-located meeting can not be scheduled, but that the organizer will be alerted when conditions allow such a conference. In this embodiment, location server 190 reviews location data at a later time. Any method for checking the location data at a later time may be used. For example, in some embodiments, location server 190 reviews the locations for organizer's co-located conference periodically, e.g., twice a day. In some embodiments, location server 190 reviews the locations for organizer's co-located conference whenever a change is made to the location data 182.

It is further assumed, for the purposed of illustration, that person C returns to home base in San Jose from San Diego on the next day, and that person A takes an unexpected trip to the San Francisco Bay area that was not entered into the commitment data 172 or associated planned location data 185. It is further assumed that, as a consequence, cell phone 311 with person A communicates with a cell antenna 312a that is located in Palo Alto Calif., which is a thirty minute drive from San Jose.

During step 220, the location server 190 receives updated location data that indicates person A is in Palo Alto and persons B, C are in San Jose. During step 230, it is determined that a meeting room in San Jose is available and that persons A, B, C are currently all in the vicinity of that room based on presence data. In some embodiments, the system 103 also determines whether one or more of the persons A, B, C who satisfy the quorum have commitments that preclude their meeting. In some embodiments, the organizer is given the option to override a prior commitment to take advantage of the persons' being in the vicinity of the same location. It is assumed for purposes of illustration that the location server 190 determines that all three persons and the meeting room are available at noon Pacific Standard Time (PST).

In step 290, the persons A, B, C are invited to meet in the room in San Jose at noon PST. Because only one site is involved, step 296 passes control to step 299; and step 298, to configure a network node, is skipped.

4.3 Particular Site Conference

In some embodiments, the system 103 and method 200 are used to determine when to hold a conference in which one or more conference sites are specified, called herein a particular site conference. A particular site conference can be organized using presence data or planned data.

If the organizer specifies one location, then the organizer is requesting a co-located conference, but unlike the case described above, this co-located conference is at a site specified by the organizer and not a site determined by circumstance.

To illustrate a particular site conference using presence data, it is assumed that an organizer wants persons from the same three representative groups described above to hold a particular site conference at two locations, designated here as east coast (E) and west coast (W) locations, which support live audio-video data transfer over the Internet. In other examples, the organizer may specify more or fewer locations.

The quorum information is received as quorum data by the location server 190 during step 212, as described above.

Data indicating the two specific sites is received from the organizer, during step 220 in some embodiments and in step 230 in other embodiments. Location data for the specified sites is received from location data server 184 based on stored location data 182. In the illustrated embodiment, commitment data for those sites is received from commitment server 174 based on commitment data 172 during step 220.

For purposes of illustration, it is further assumed that the presence data does not show any combination in which all three persons are in the vicinity of the two specific sites at the current time.

In step 230, the location for the two specific sites are determined based on the input from the organizer. If the planned location data 185 shows a future time when persons from all three representative groups are in the vicinity of those specific sites, that future time and those invitees are also determined during step 230. Control passes to step 290 to send invitations to the invitees. Because two sites are involved, step 296 passes control to step 298 to configure one or more network nodes. In embodiments in which only one specific site is input by the organizer, control passes instead to step 299; and step 298 is skipped.

It is further assumed for purposes of illustration that planned location data 185 does not include any future time when persons from all three representative groups are in the vicinity of the specified sites at the same time. The organizer is informed that the particular site conference can not be scheduled, but that the organizer will be alerted when conditions allow such a conference. In this embodiment, location server 190 reviews location data at a later time. Any method for checking the location data at a later time may be used. For example, in some embodiments, location server 190 reviews the locations for organizer's particular site conference periodically, e.g., twice a day. In some embodiments location server 190 reviews the locations for organizer's particular site conference whenever a change is made to the location data 182.

It is further assumed, for the purposed of illustration, that person C returns from San Diego on the next day to home base in San Jose in the vicinity of site w. It is further assumed that person A remains for the rest of the week in New York City in the vicinity of site E.

During step 220, the location server 190 receives updated location data that indicates persons B, C are in San Jose and person A is in New York City. During step 230, location server 190 determines, based on presence data, that persons B, C are currently both in the vicinity of site W and that person A is in the vicinity of site E. In some embodiments, the system 103 also determines whether one or more of the persons A, B, C who satisfy the quorum have commitments that preclude their meeting. In some embodiments, the organizer is given the option to override a prior commitment to take advantage of the persons' being in the vicinity of the particular sites. It is assumed for purposes of illustration that the location server 190 determines that all three persons and the sites E and W are available at noon Eastern Standard Time (EST) of the current day.

In step 290, the persons B, C are invited to meet in the room at site W at noon EST and person A is invited to meet in the room at site E.

Because two sites are involved, step 296 passes control to step 298 to configure a network node. It is assumed for purposes of illustration that during step 298, network devices are configured to support live audio-video packet-switching. It is further assumed that multi-media equipment 328 are at site E and that additional multi-media equipment (not shown) are connected to computer 321. In this embodiment, during step 298 the location server 190 configures edge devices 322d, 322b, and intervening network devices (not shown) of network 320 to support live audio-video packet-switching.

5. Hardware Overview

Figure 4:
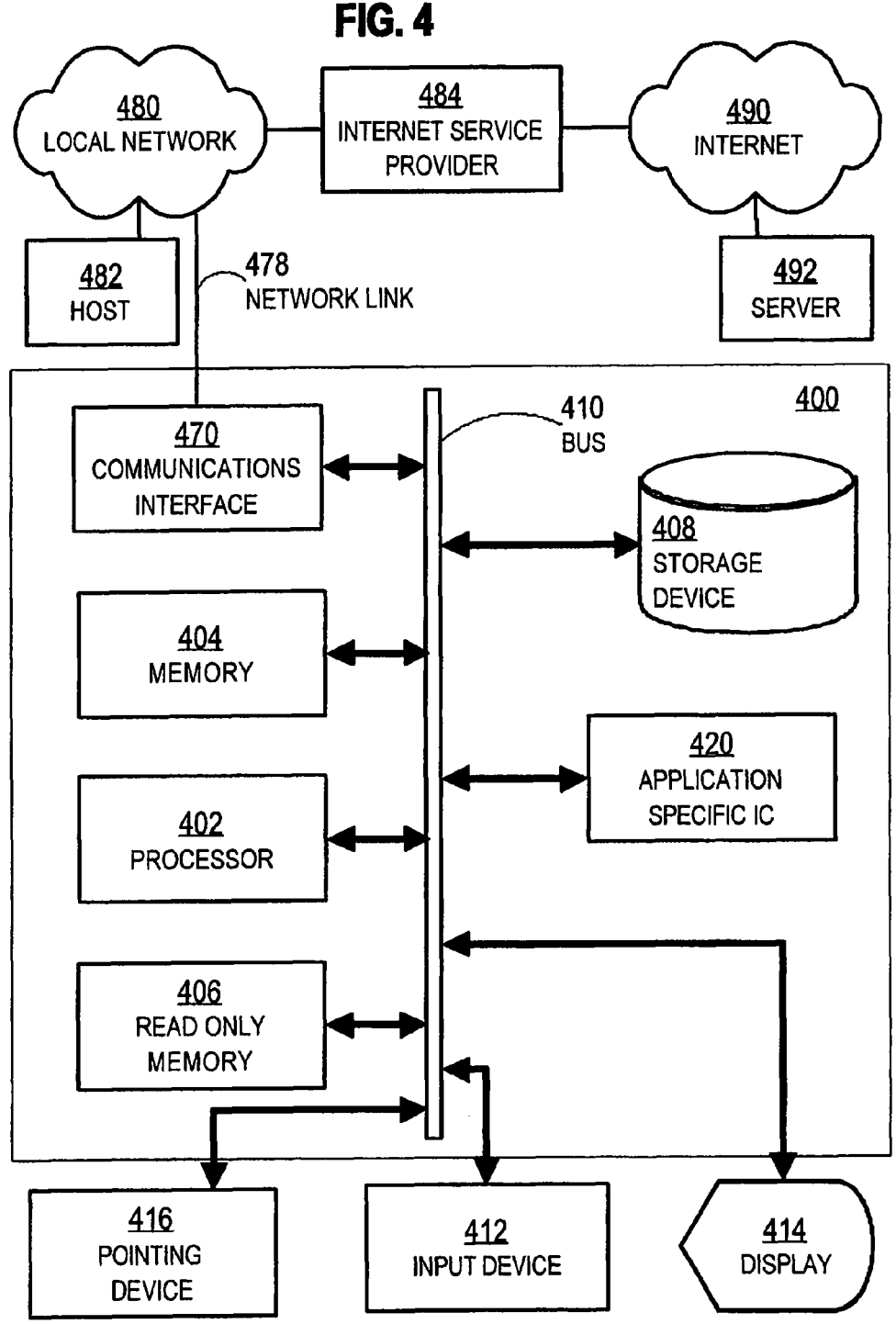
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a communication mechanism such as a bus 410 for passing information between other internal and external components of the computer system 400. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 410 includes many parallel conductors of information so that information is transferred quickly among devices coupled to the bus 410. One or more processors 402 for processing information are coupled with the bus 410. A processor 402 performs a set of operations on information. The set of operations include bringing information in from the bus 410 and placing information on the bus 410. The set of operations also typically include comparing two or more units of information, shifting positions of units of information, and combining two or more units of information, such as by addition or multiplication. A sequence of operations to be executed by the processor 402 constitute computer instructions.

Computer system 400 also includes a memory 404 coupled to bus 410. The memory 404, such as a random access memory (RAM) or other dynamic storage device, stores information including computer instructions. Dynamic memory allows information stored therein to be changed by the computer system 400. RAM allows a unit of information stored at a location called a memory address to be stored and retrieved independently of information at neighboring addresses. The memory 404 is also used by the processor 402 to store temporary values during execution of computer instructions. The computer system 400 also includes a read only memory (ROM) 406 or other static storage device coupled to the bus 410 for storing static information, including instructions, that is not changed by the computer system 400. Also coupled to bus 410 is a non-volatile (persistent) storage device 408, such as a magnetic disk or optical disk, for storing information, including instructions, that persists even when the computer system 400 is turned off or otherwise loses power.

Information, including instructions, is provided to the bus 410 for use by the processor from an external input device 412, such as a keyboard containing alphanumeric keys operated by a human user, or a sensor. A sensor detects conditions in its vicinity and transforms those detections into signals compatible with the signals used to represent information in computer system 400. Other external devices coupled to bus 410, used primarily for interacting with humans, include a display device 414, such as a cathode ray tube (CRT) or a liquid crystal display (LCD), for presenting images, and a pointing device 416, such as a mouse or a trackball or cursor direction keys, for controlling a position of a small cursor image presented on the display 414 and issuing commands associated with graphical elements presented on the display 414.

In the illustrated embodiment, special purpose hardware, such as an application specific integrated circuit (IC) 420, is coupled to bus 410. The special purpose hardware is configured to perform operations not performed by processor 402 quickly enough for special purposes. Examples of application specific ICs include graphics accelerator cards for generating images for display 414, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 400 also includes one or more instances of a communications interface 470 coupled to bus 410. Communication interface 470 provides a two-way communication coupling to a variety of external devices that operate with their own processors, such as printers, scanners and external disks. In general the coupling is with a network link 478 that is connected to a local network 480 to which a variety of external devices with their own processors are connected. For example, communication interface 470 may be a parallel port or a serial port or a universal serial bus (USB) port on a personal computer. In some embodiments, communications interface 470 is an integrated services digital network (ISDN) card or a digital subscriber line (DSL) card or a telephone modem that provides an information communication connection to a corresponding type of telephone line. In some embodiments, a communication interface 470 is a cable modem that converts signals on bus 410 into signals for a communication connection over a coaxial cable or into optical signals for a communication connection over a fiber optic cable. As another example, communications interface 470 may be a local area network (LAN) card to provide a data communication connection to a compatible LAN, such as Ethernet. Wireless links may also be implemented. For wireless links, the communications interface 470 sends and receives electrical, acoustic or electromagnetic signals, including infrared and optical signals, that carry information streams, such as digital data. Such signals are examples of carrier waves.

The term computer-readable medium is used herein to refer to any medium that participates in providing instructions to processor 402 for execution. Such a medium may take many forms, including, but not limited to, non-volatile media, volatile media and transmission media. Non-volatile media include, for example, optical or magnetic disks, such as storage device 408. Volatile media include, for example, dynamic memory 404. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape, or any other magnetic medium, a compact disk ROM (CD-ROM), or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Network link 478 typically provides information communication through one or more networks to other devices that use or process the information. For example, network link 478 may provide a connection through local network 480 to a host computer 482 or to equipment 484 operated by an Internet Service Provider (ISP). ISP equipment 484 in turn provides data communication services through the public, world-wide packet-switching communication network of networks now commonly referred to as the Internet 490. A computer called a server 492 connected to the Internet provides a service in response to information received over the Internet. For example, server 492 provides information representing video data for presentation at display 414.

The invention is related to the use of computer system 400 for implementing the techniques described herein. According to one embodiment of the invention, those techniques are performed by computer system 400 in response to processor 402 executing one or more sequences of one or more instructions contained in memory 404. Such instructions, also called software and program code, may be read into memory 404 from another computer-readable medium such as storage device 408. Execution of the sequences of instructions contained in memory 404 causes processor 402 to perform the method steps described herein. In alternative embodiments, hardware, such as application specific integrated circuit 420, may be used in place of or in combination with software to implement the invention. Thus, embodiments of the invention are not limited to any specific combination of hardware and software.

The signals transmitted over network link 478 and other networks through communications interface 470, which carry information to and from computer system 400, are exemplary forms of carrier waves. Computer system 400 can send and receive information, including program code, through the networks 480, 490 among others, through network link 478 and communications interface 470. In an example using the Internet 490, a server 492 transmits program code for a particular application, requested by a message sent from computer 400, through Internet 490, ISP equipment 484, local network 480 and communications interface 470. The received code may be executed by processor 402 as it is received, or may be stored in storage device 408 or other non-volatile storage for later execution, or both. In this manner, computer system 400 may obtain application program code in the form of a carrier wave.

Various forms of computer readable media may be involved in carrying one or more sequence of instructions or data or both to processor 402 for execution. For example, instructions and data may initially be carried on a magnetic disk of a remote computer such as host 482. The remote computer loads the instructions and data into its dynamic memory and sends the instructions and data over a telephone line using a modem. A modem local to the computer system 400 receives the instructions and data on a telephone line and uses an infra-red transmitter to convert the instructions and data to an infra-red signal, a carrier wave serving as the network link 478. An infrared detector serving as communications interface 470 receives the instructions and data carried in the infrared signal and places information representing the instructions and data onto bus 410. Bus 410 carries the information to memory 404 from which processor 402 retrieves and executes the instructions using some of the data sent with the instructions. The instructions and data received in memory 404 may optionally be stored on storage device 408, either before or after execution by the processor 402.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for scheduling a conference among multiple persons, comprising:
   receiving quorum data that indicates a quorum for a particular conference;
   receiving availability data that indicates availability of a plurality of persons who satisfy the quorum for attending the particular conference;
   determining a plurality of proposed locations that support remote conferencing among the plurality of persons for the particular conference based on the availability data and the quorum data; and
   configuring a network node based on the plurality of proposed locations that support remote conferencing among the plurality of persons who satisfy the quorum.

2. The method of claim 1, further comprising:
   receiving data indicating a type of remote conferencing, and
   determining the plurality of proposed locations based on the type of remote conferencing.

3. The method of claim 1, further comprising:
   receiving data indicating at least one of a data remote conference, an audio remote conference, a video remote conference, and a multi-media remote conference.

4. The method of claim 1, further comprising:
   receiving data indicating a remote conference using at least one of a circuit-switching network, a packet-switching network, and a cellular telephone network.

5. The method of claim 1, wherein the availability data indicates whether a particular person of the plurality of persons can communicate remotely at a time within a duration of a previous commitment for the particular person.

6. The method of claim 1, wherein the availability data indicates whether a particular person of the plurality of persons can communicate using a particular mode of communication at a time within a duration of a previous commitment for the particular person.

7. The method of claim 6, further comprising:
   determining a time for the particular conference with the particular person during the previous commitment; and
   conducting the particular conference using the particular mode of communication with the particular person.

8. The method of claim 7, wherein the particular mode of communication is an in-person meeting.

9. The method of claim 7, wherein the particular mode of communication is remote communication.

10. The method of claim 1, wherein the availability data includes presence data based on the current location of at least one of the plurality of persons who satisfy the quorum.

11. An apparatus for scheduling a conference among multiple persons, comprising:
    a network interface that is coupled to a network for communicating one or more packet flows therewith;
    a processor; and
    one or more stored sequences of instructions which, when executed by the processor, cause the processor to perform:
    receiving quorum data that indicates a quorum for a particular conference;
    receiving availability data that indicates availability of a plurality of persons who satisfy the quorum for attending the particular conference;
    determining a plurality of proposed locations that support remote conferencing among the plurality of persons for the particular conference based on the availability data and the quorum data; and
    configuring a network node based on the plurality of proposed locations that support remote conferencing among the plurality of persons who satisfy the quorum.

12. The apparatus of claim 11, wherein the one or more stored sequences of instructions cause the processor to perform:
    receiving data indicating a type of remote conferencing, and
    determining the plurality of proposed locations based on the type of remote conferencing.

13. The apparatus of claim 12, wherein the one or more stored sequences of instructions cause the processor to perform:
    receiving data indicating at least one of a data remote conference, an audio remote conference, a video remote conference, and a multi-media remote conference.

14. The apparatus of claim 12, wherein the one or more stored sequences of instructions cause the processor to perform:
    receiving data indicating a remote conference using at least one of a circuit-switching network and a packet-switching network.

15. The apparatus of claim 11, wherein the availability data includes receiving data that indicates whether a particular person of the plurality of persons can communicate remotely at a time within a duration of a previous commitment for the particular person.

16. The apparatus of claim 11, wherein the availability data that indicates availability of a plurality of persons who satisfy the quorum for attending the particular conference and whether a particular person of the plurality of persons can communicate using a particular mode of communication at a time within a duration of a previous commitment for the particular person.

17. The apparatus of claim 16, further comprising:
determining a time for the particular conference with the particular person during the previous commitment; and
conducting the particular conference using remote communications with the particular person.

18. The apparatus of claim 11, wherein the particular mode of communication is an in-person meeting.

19. The apparatus of claim 11, wherein the particular mode of communication is remote communication.

20. A non-transitory computer-readable medium encoded with computer executable instructions operable to:
receive quorum data that indicates a quorum for a particular conference;
receive availability data that indicates availability of a plurality of persons who satisfy the quorum for attending the particular conference;
determine a plurality of proposed locations that support remote conferencing among the plurality of persons for the particular conference based on the availability data and the quorum data; and
configure a network node based on the plurality of proposed locations that support remote conferencing among the plurality of persons who satisfy the quorum.

21. The non-transitory computer-readable medium of claim 20, wherein a proposed location is a location in a vicinity where the plurality of persons who satisfy the quorum for the particular conference are located.

\* \* \* \* \*